(12) United States Patent
Blagin et al.

(10) Patent No.: US 6,791,465 B2
(45) Date of Patent: Sep. 14, 2004

(54) TAMPER INDICATING BOLT

(76) Inventors: Sergei V. Blagin, pr. Lenin 6, apt. 19, 607190, Sarov (RU); Boris P. Barkanov, st. Zernova 68, apt. 313, 607200, Sarov (RU)

( * ) Notice: Subject to any disclaimer, the term of this patent is extended or adjusted under 35 U.S.C. 154(b) by 165 days.

(21) Appl. No.: 09/903,844

(22) Filed: Jul. 11, 2001

(65) Prior Publication Data

US 2002/0044063 A1 Apr. 18, 2002

Related U.S. Application Data

(60) Provisional application No. 60/217,475, filed on Jul. 11, 2000.

(51) Int. Cl.[7] .............................................. G08B 21/00
(52) U.S. Cl. ..................... 340/665; 340/652; 340/641; 340/542; 340/426; 340/539.1; 411/2; 411/14; 73/761; 73/763
(58) Field of Search ................................ 340/665, 652, 340/541, 542, 426, 539.1; 411/2, 14; 73/761, 763

(56) References Cited

U.S. PATENT DOCUMENTS

| | | | |
|---|---|---|---|
| 5,097,253 A | * 3/1992 | Eschbach et al. | ........... 340/454 |
| 5,189,396 A | * 2/1993 | Stobbe | ....................... 340/541 |
| 5,461,923 A | 10/1995 | Meisterling | ................... 73/761 |
| 5,656,996 A | * 8/1997 | Houser | ........................ 340/541 |
| 5,807,048 A | 9/1998 | d'Agraives, et al. | ........... 411/2 |
| 5,877,685 A | * 3/1999 | Eriksson | ..................... 340/545 |
| 6,069,563 A | 5/2000 | Kadner et al. | .............. 340/571 |
| 6,204,771 B1 | 3/2001 | Ceney | ........................ 340/665 |

OTHER PUBLICATIONS

Maxim data sheet; Precision, Low–Power, Low–Droput, SOT23–3 Voltage References.
Data sheet; PICMICRO™ Devices; PIC1616f628 Device.
Nasa data sheet; Success Stories; NASA "Smart Bolts" Likely to revolutionize Some Industries; 5/97.

* cited by examiner

*Primary Examiner*—Jeffery Hofsass
*Assistant Examiner*—Hung Nguyen
(74) *Attorney, Agent, or Firm*—George H. Libman

(57) ABSTRACT

A tamper-indicating fastener has a cylindrical body with threads extending from one end along a portion of the body, and a tamper indicating having a transducer for converting physical properties of the body into electronic data; electronics for recording the electronic data; and means for communicating the recorded information to a remote location from said fastener. The electronics includes a capacitor that varies as a function of force applied by the fastener, and non-volatile memory for recording instances when the capacitance varies, providing an indication of unauthorized access.

15 Claims, 4 Drawing Sheets

TAMPER INDICATING BOLT

This application claims benefit of 60/217,475 filed on Jul. 11, 2000.

The United States Government has rights in this invention pursuant to Department of Energy Contract No. DE-AC04-94AL85000 with Sandia Corporation.

BACKGROUND OF THE INVENTION

A seal may be used for verification by a first person that a container in the possession of a second person has not been opened. The seal is typically a device that will be destroyed if the container is opened, and which has unique characteristics to deter the second person from opening the container and subsequently replacing the original seal with an identical copy.

Several patents are noted as examples of the technology in this field, and for their discussions of the background art. U.S. Pat. No. 5,461,923 of Meisterling shows an acoustic transducer incorporated into a fastener. U.S. Pat. No. 6,204,771 of Ceney describes a fastener system that senses the strain on a bolt by measuring the variation in length of the bolt. U.S. Pat. No. 5,807,048 of d'Agraives et al discloses a high-consequence seal/fastener having mechanical properties that cause a unique ultrasonic signature. And U.S. Pat. No. 6,069,563 of Kadner et al discloses an electronic seal designed to report tamper events.

SUMMARY OF THE INVENTION

It is an object of this invention to provide a seal/fastener that seals a container, stores information about the closures, and stores information about attempts to open the container.

It is another object of this invention to provide a seal/fastener that stores a coded identification to prevent substitution of an identical fastener.

To achieve the foregoing and other objects, and in accordance with the purpose of the present invention, as embodied and broadly described herein, the invention discloses a tamper-indicating fastener having a cylindrical body with threads extending from one end along a portion of the body, and a tamper indicating portion extending from an opposite end of said body. The tamper indicating portion includes a transducer for converting physical properties of the body into electronic data; electronics for recording electronic data; and means for communicating with a remote location.

Additional objects, advantages, and novel features of the invention will become apparent to those skilled in the art upon examination of the following description or may be learned by practice of the invention. The objects and advantages of the invention may be realized and attained as particularly pointed out in the appended claims.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

Figure 1:
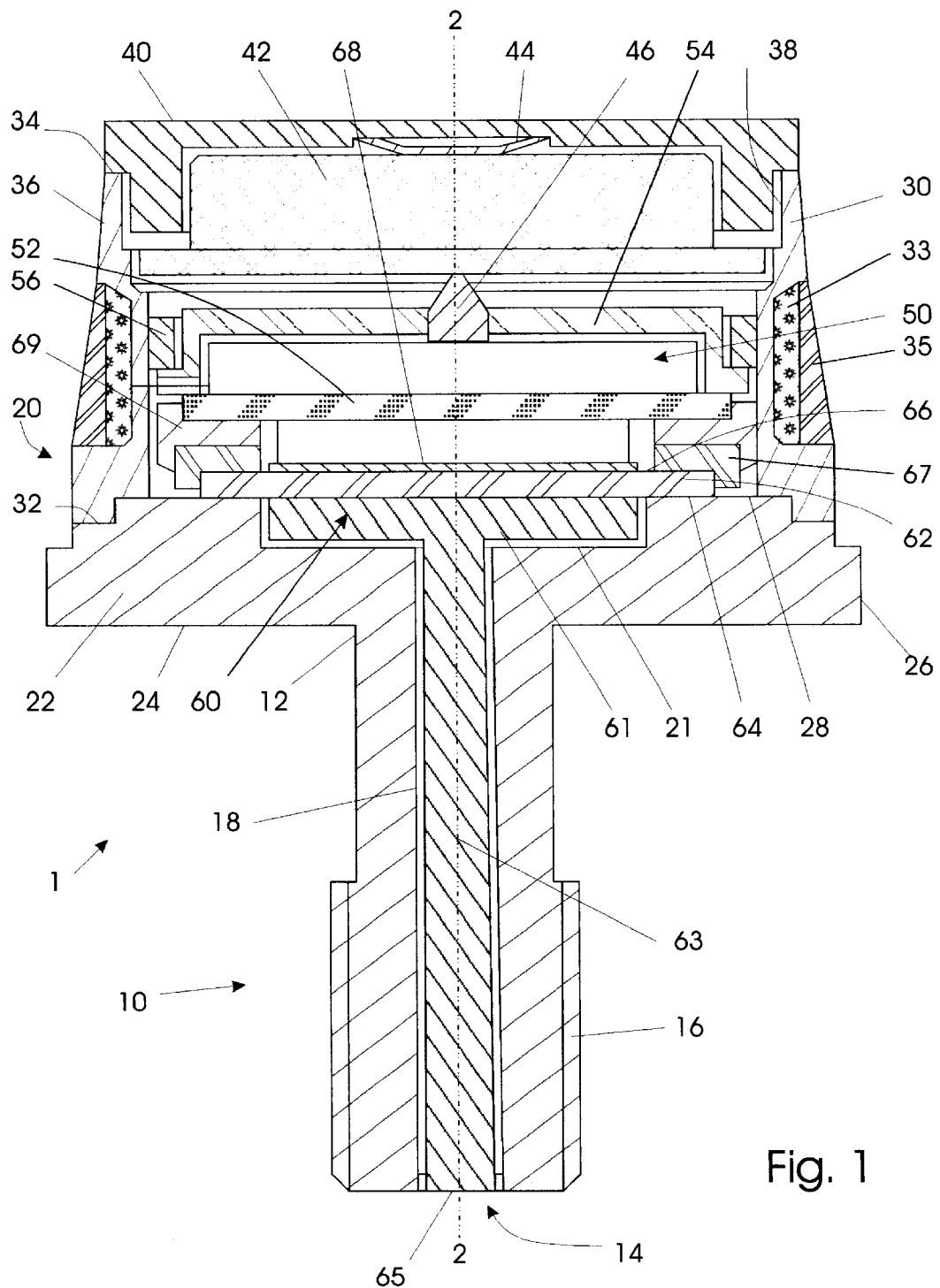
FIG. 1 shows an embodiment of the invention.

In accordance with the embodiment of the invention disclosed in FIG. 1, a tamper indicating fastener 1 is a bolt with a cylindrical body 10 extending along an axis 2 from one end 12 to an other end 14. Threads 16 are provided along body 10 extending from other end 14 to permit fastener 1 to be either screwed into a threaded hole or to receive a threaded nut in a manner well known in the fastener art. Fastener 1 also includes a head 20 which extends along axis 2 from end 12 of body 10, and which has a larger diameter than body 10.

Head 20 includes a base 22 extending from end 12 and having a radial outer surface 24, a perimeter 26 extending completely around outer surface 24, and an inner surface 28 spaced from outer surface 24. Inner surface 28 includes a recess 21 for a metal plate as discussed hereinafter. The shape of perimeter 26 is not critical to the invention. Depending on the application, the perimeter may be faceted in the manner of a nut to facilitate application of rotary pressure with a wrench when fastener 1 is installed, as discussed hereinafter.

Head 20 further includes a side wall 30 extending from a lower edge 32 around perimeter 26 and away from threads 16 to an upper edge 34. Side wall 30 has an outer surface 36 and an opposed inner surface 38. The perimeter of side wall 30 does not have to be identical to perimeter 26 of base 22, and preferably is round, as side wall 30 includes a coil 35 as discussed hereinafter. A cover 40 has a perimeter adjacent upper edge 34 and encloses a head volume with inner surfaces 28 and 38.

The electronics which enable fastener 1 to record unauthorized access to a fastened object are contained within the volume of head 20. A battery 42, such as a Duracell® DL2450 LiMnO$_2$ cell, is contained directly under cover 40. A spring 44 provides good electrical connection between one electrical contact of battery 42 and metal cover 40 (as shown at SC3 in FIGS. 4 and 5). The other contact of battery 42 is connected through pin 46 (SC2) to an electronic module 50 (FIG. 4) that records the stress in fastener 1 as measured by capacitor 60. A dielectric cover 54 is provided over electronic module 50, and a nut 56, screwed into inner surface 38 of side 30, holds cover 54 in place.

Figure 2:
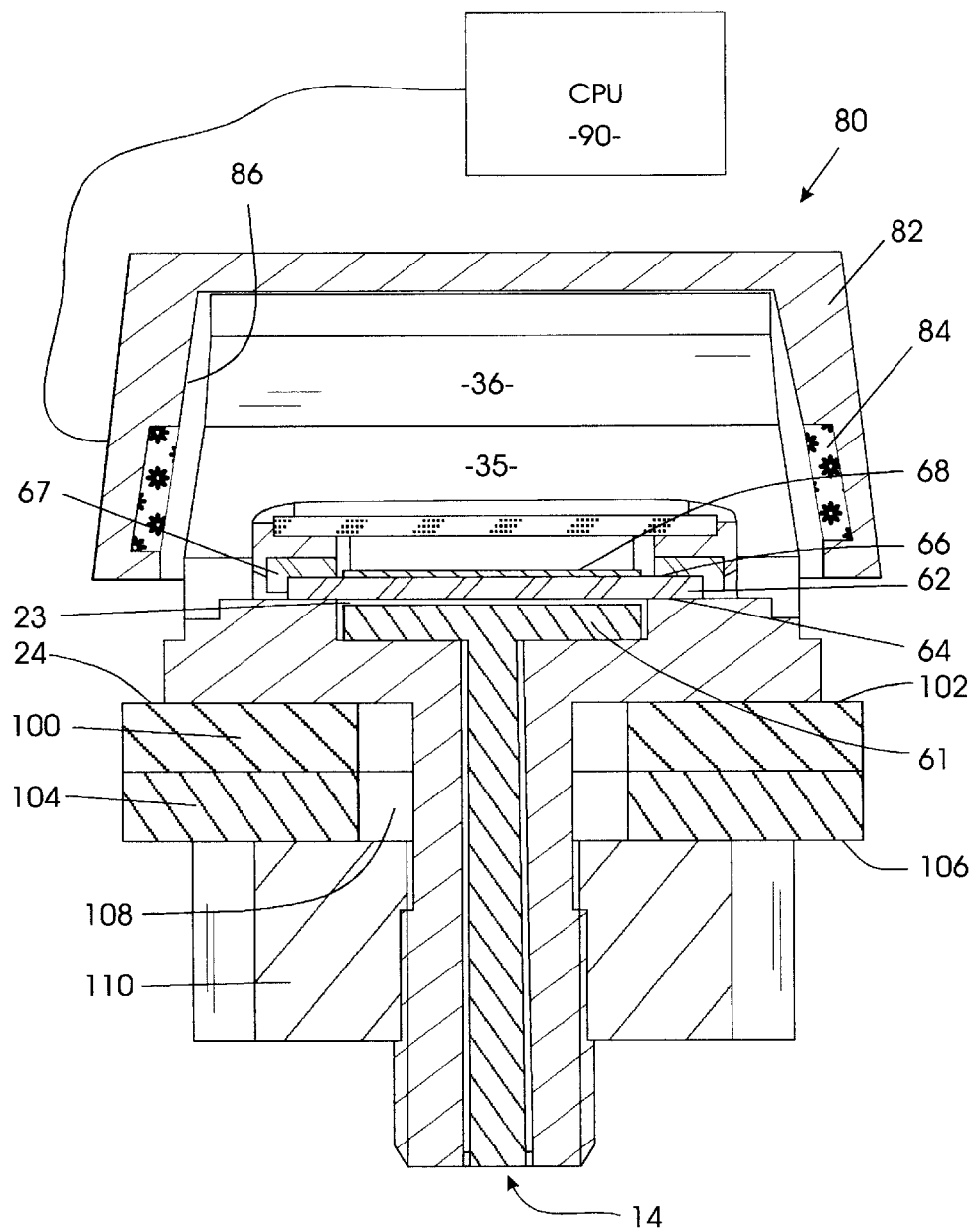
FIG. 2 shows the embodiment of FIG. 1 with an electromagnetic interface and under strain.

The operation of the invention may be understood from FIG. 2, where a plate 100 (which may represent the cover of a container), has been sealed against another plate 104 (which may represent a portion of the body of the container) by placing fastener 1 through a hole 108 in both plates. A nut 110 has been threaded on threads 16 of fastener 1 and rotated until it presses against surface 106 of plate 104, while surface 24 of base 22 presses against surface 102 of plate 100. It should be apparent that as nut 110 is further tightened (or, similarly, as fastener 1 is further rotated into nut 110), other end 14 of fastener 1 is stretched. As discussed below, this minute change of length in body 10 is utilized to provide a change in electrical capacitance that is indicative of the force applied to fastener 1.

A capacitor consists of two metal plates separated by a dielectric. Capacitor 60 is formed of a dielectric disk 62 of ceramic or other high dielectric material that has opposed surfaces 64 and 66. An insulating ring 67 is placed around the edge of disk 62, and both ring 67 and disk 62 are held against surface 28 over recess 21 by a metal nut 69 that screws into the inner surface 38 of side wall 30. One plate for capacitor 60 is provided on opposed surface 66, where a central portion slightly smaller in diameter than recess 21 is covered by a metal layer 68, such as plated silver. The other plate is provided by a metal disk 61 in recess 21. A rod 63 has one end fastened to an opposite side of metal disk 61, and an opposed end placed within a hole 18 extending parallel to (preferably, coaxial with) axis 2 into body 10 towards threads 16. As shown, end 65 of rod 63 is laser welded or otherwise fastened to other end 14 of body 10. Because the length of rod 63 is constant, any movement of end 65 of rod 63 relative to base 22 will cause movement of metal disk 61 relative to dielectric disk 62.

FIG. 1 shows disk 61 to be in close proximity with surface 64 of dielectric disk 62 when fastener 1 is not under stress. FIG. 2 shows disk 61 spaced from surface 64 when body 10 has been stretched by the stress of nut 110. The increase in gap 23 between metal disk 61 and dielectric 62 ensures that the capacitance of the fastener under stress is much less than the non-stressed capacitance of FIG. 1. Measurement of this capacitance by electronic module 50 provides an electronic indication of stress on fastener 1.

Figure 3:
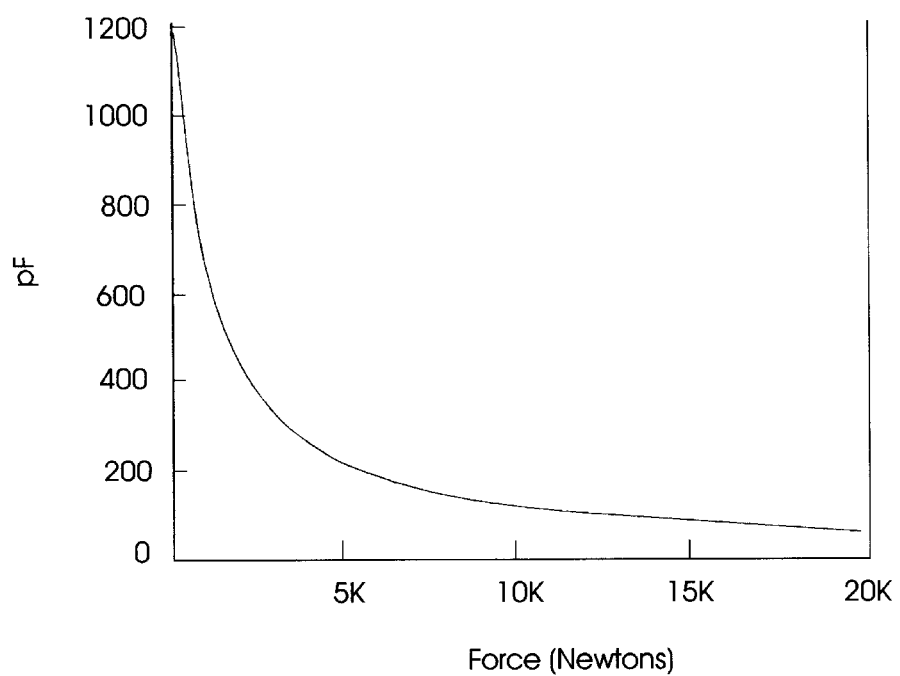
FIG. 3 shows a graph of capacitance as a function of force in the invention.

FIG. 3 shows a graph of the calculated capacitance Cful in pF for a capacitor 60 as a function of tension Fs on a typical fastener 1. For these calculations, total displacement of plunger 61 is assumed to be 0.02 mm; the permittivity of disk 62, $\epsilon=8000$, the thickness of disk 62=1 mm; and the diameter of capacitor 60 is about 15 mm. The graph shows that capacitance varies from greater than 800 pF when fastener 1 is not under tension to about 62 pF under very high tension. Accordingly, if the fastener is tightened sufficiently that the capacitance is on the generally horizontal portion of FIG. 3, environmental variations on fastener 1 will not cause false indications. Releasing the tension on fastener 1, an event which indicates that the fastener is being removed, will cause the capacitance to greatly increase, resulting in a recorded event.

Figure 5:
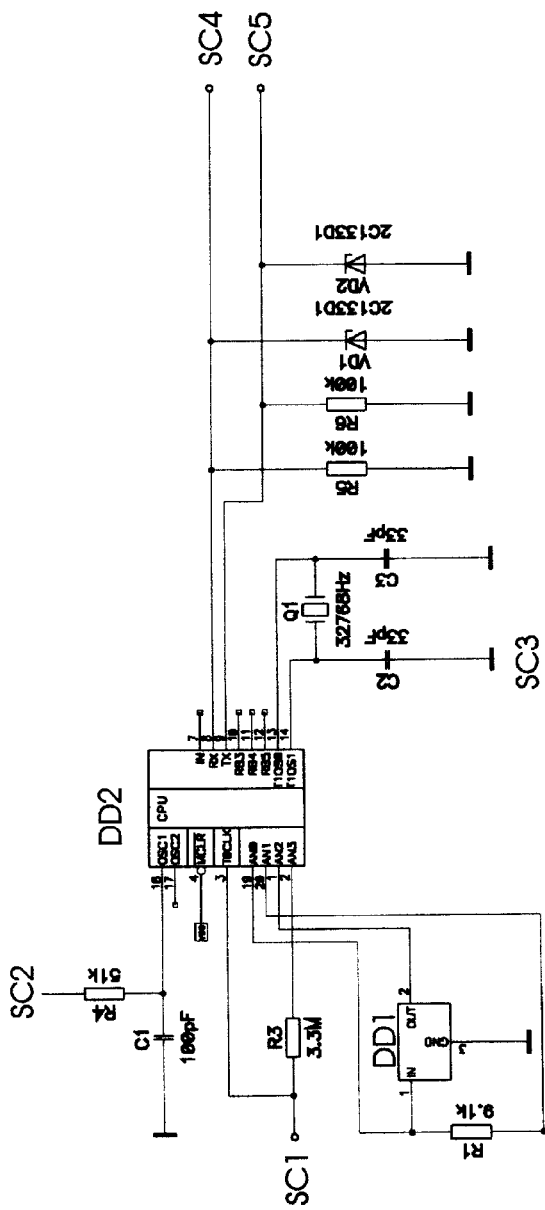
FIG. 5 shows a detail of the circuit of FIG. 4.
Figure 4:
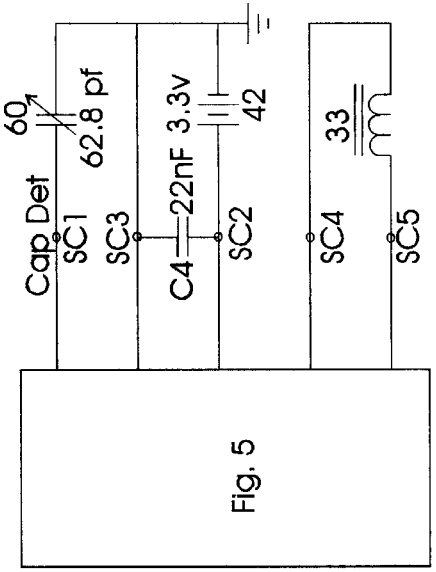
FIG. 4 shows the electronic circuit of an embodiment of the invention.

Capacitor 60 and battery 42 are connected to an electrical circuit 50 on printed circuit board 52 as shown in FIGS. 4 and 5. FIG. 4 shows the overall circuit, with the components in the rectangle being shown in FIG. 5. The components are arranged on either side of printed circuit board 52 in a manner well known to those of ordinary skill in the art.

Information is communicated to and from head 20 by a coil 33 embedded into outer side 36 of side 30. A layer 35 of potting material overlays and protects coil 33 in a manner well known in the art. Coil 33 is connected to electronic module 50 by wires as shown in FIGS. 4 and 5.

A communication device 80 is shown in FIG. 2 to fit over head 20. Device 80 may be generally bowl-shaped with a rim 82 that surrounds outer side 36 of head 20. A coil 84 mounted in an inner surface 86 of device 80 is adjacent and spaced from coil 33 when device 80 is placed over head 20 as shown in FIG. 2. Coil 80 is coupled to a data processing device such as programmed computer 90, which is used to provide instructions to fastener 1 when it is installed, and to record the status of fastener 1 as it is monitored. The programming of computer 90 is a routine matter for one of ordinary skill in the art.

Communication between device 80 and head 20 is preferably transmitted in the format of a Manchester code at a frequency of about 10K Hertz. (In a Manchester code, (a) data and clock signals are combined to form a single self-synchronizing data stream, (b) each encoded bit contains a transition at the midpoint of a bit period, (c) the direction of transition determines whether the bit is a "0" or a "1," and (d) the first half is the true bit value and the second half is the complement of the true bit value.) Known advantages of using the Manchester code in this application are that it is self-clocking, and that it does not have a DC component, so that it may be transmitted inductively.

The heart of the electrical circuit is a single chip microcontroller DD2 such as the PIC16F628 from Microchip Technology Inc®. This low power, high speed device contains 2048×14 words of FLASH program memory, 128 EEPROM data memory bytes for storing non-volatile information, and 224 bytes of user RAM. It includes three digital timers, power-on reset, four user-programmable ID locations, and two analog comparators. The clock is stabilized at 4 MHz by crystal resonator Q1. As controlled by the software in DD2, the clock records date and time.

Measurement of the magnitude of capacitor 60 is carried out by an RC circuit including resistor R3 (FIG. 5) and capacitor 60, which elements are connected at SC1. Once every 2 seconds, microcontroller DD2 applies a voltage pulse to R3. This voltage charges capacitor 60 with an exponential rise. The voltage on capacitor 60 (SC1) is detected at pin 3 of DD2 and compared with a preset value. When the voltage reaches this value, the time to reach the value is stored in the processor. This time is compared with the time value measured after initial tightening during installation of fastener 1. If the measured time is shorter, indicating a lower capacitance, an unauthorized access is logged in non-volatile memory with a date/time stamp.

Battery voltage is monitored by a MAX6012 voltage reference DD1, a product of Dallas Semiconductors. The output voltage of DD1 is applied to an inverting input of a comparator in DD1, and the voltage from battery 42 is divided by R1, R2 and applied to an noninverting input of the comparator. When the input voltage falls below a predetermined amount of the output voltage, controller DD2 fixes the date and time of the low voltage event in nonvolatile memory. When the operator checks the status of the device, he will be advised that a new battery must be inserted into fastener 1.

The operation of fastener 1 is controlled by software loaded in DD2 that executes the following functions: recording of unauthorized access; storing date of unauthorized accesses; storing date of fastener installation; monitoring tension on fastener; protection of tag data from unauthorized access; and execution of commands. Additional information on these functions is set forth below:

To save power, electronic module 50 is only interrogated for a few milliseconds every two seconds. Upon receipt of an interrupt from a timer on DD2, the system is initialized. Since a fastener could not be removed and subsequently tightened within two seconds, a high capacitance reading during interrogation is an indication of unauthorized access that is recorded, along with date/time information. More than 16 instances of access may be stored in the memory of DD2. While it is awake, the system also checks to see if it is in communication with an adjacent device 80 and computer 90 as shown in FIG. 2. If the answer is "yes", the instructions are received from device 80 and fastener 1 makes an appropriate response. If the answer is "no", the system goes back to sleep for another two seconds.

The tag information stored in memory of DD2 is protected from unauthorized access by a password, so that the person who applies the seal is the only one who can change the seal information. Of the 138 available bytes of data, about 10 are used to record status at set-up, 4 to record the date of installation, 4 to record the date that monitoring expires, 48 to record the dates of unauthorized events, 72 bytes to record service information (e.g., what is sealed; who is inspecting) and 16 bytes for the password for protection of the above data. An unauthorized person who replaces fastener 1 could not reinstall the password-protected identity of the original device, which means that the unauthorized actions would be detected.

The software that implements this system is a conventional matter of design to one of ordinary skill in the art. As described, fastener 1 takes the form of a bolt and has a head diameter on the order of 25 mm, although other sizes and shapes of fasteners are contemplated. All electronics components are standard, commercially available, devices, and it is contemplated that one of ordinary skill in the art could easily design equivalent circuits to those disclosed herein.

Changes in the physical construction of the claim invention are also contemplated. For example, a fastener 1 that was screwed into a threaded hole would operate in the same manner as a fastener that is screwed into a nut. And any size and shape of the components of fastener 1 is contemplated, as long as the necessary electronics for head 20 fit inside.

Other embodiments to power the invention are also contemplated. For example, a second embodiment has been designed which utilizes a piezoelectric power supply as the source of power for bolt. In this embodiment, a serrated disk on the base of the bolt locks into a container in the manner of a lock washer as the bolt is tightened. The bolt head has upper and lower parts which rotate together as the fastener is tightened, and which slip as the fastener is unscrewed. As the upper and lower parts slip, they repeatedly traverse a ramp which imparts mechanical energy to a piezoelectric crystal. The energy from the crystal powers an internal microprocessor which records a tamper event.

Also, other features of the invention may be modified within the scope of the claims. For example, other known techniques may be used for data communication to and from head 20. While the disclosed inductively coupled coils minimizes power requirements at head 20, a radio could be incorporated either into device 20 or device 80 for wireless communication with either a remote computer 90 or other remote location. It is intended that the scope of the invention be defined by the claims appended hereto.

What is claimed is:

1. A tamper indicating fastener having a cylindrical body with threads extending from one end along a portion of the body, and a tamper indicating portion extending from an other end of said body, said tamper indicating portion comprising:

a transducer for converting physical properties of the body into electronic data:

electronic means for processing the electronic data; and means for communicating the processed data to a remote location from said fastener.

2. The tamper indicating fastener of claim 1 wherein said transducer comprises a capacitor for measuring strain in the fastener.

3. The tamper indicating fastener of claim 2 wherein said capacitor comprises a dielectric disk having spaced surfaces, one surface being covered with metal, the other surface facing a first surface of a movable metal plate, said plate having an opposed second surface, wherein the distance between said other surface of said disk and said first surface of said plate being a function of the strain in the fastener.

4. The tamper indicating fastener of claim 3 wherein said body extends along an axis and has a hole extending through said body parallel to said axis from said tamper indicating portion towards said threads; and a rod within said hole, said rod being fastened to said body only at one end within said hole, an other end of said rod being fastened to said opposed second surface of said movable plate.

5. The tamper indicating fastener of claim 2 wherein said electronic means comprises a microcontroller and non-volatile memory, said electronic means storing data indicative of a reduction in strain on said fastener in said non-volatile memory.

6. The tamper indicating fastener of claim 5 wherein said electronic means further stores encoded data indicative of the identity of said fastener.

7. The tamper indicating fastener of claim 5 further comprising a battery in said tamper indicating portion for powering said electronic means.

8. The tamper indicating fastener of claim 7 wherein said microprocessor includes a clock, and said microprocessor records the date and time of a reduction in strain in said non-volatile memory.

9. The tamper indicating fastener of claim 1 wherein said cylindrical body defines a threaded portion of said fastener extending along an axis and said tamper indicating portion forms a head having a larger diameter than said threaded portion;

said head having a base of larger diameter than said threaded portion centered on said axis at one end of said threaded portion; a side wall extending away from said threads, and a cover enclosing a volume also defined by said side wall and said base.

10. The tamper indicating fastener of claim 9 wherein said means for communicating comprises a first inductive coil within said side wall, said first inductive coil being electrically connected to said electronic means.

11. The tamper indicating fastener of claim 10 further comprising a communicating device comprising:

a second inductive coil having an inner diameter larger than the outer diameter of said first inductive coil;

a housing containing said second inductive coil, wherein said second inductive coil is proximate said first inductive coil when said housing is placed over said head of said fastener; and means for communicating electrical data between said second inductive coil and a data processing device.

12. The tamper indicating fastener of claim 11 wherein said electronic means comprises a microcontroller and non-volatile memory, said electronic means storing data indicative of a reduction in strain on said fastener in said non-volatile memory.

13. The tamper indicating fastener of claim 12 wherein said electronic means further stores encoded data indicative of the identity of said fastener.

14. The tamper indicating fastener of claim 13 further comprising a battery in said tamper indicating portion for powering said electronic means.

15. The tamper indicating fastener of claim 14 wherein said microprocessor includes a clock, and said microprocessor records the date and time of a reduction in strain in said non-volatile memory.

* * * * *